(12) United States Patent
White et al.

(10) Patent No.: US 7,716,351 B1
(45) Date of Patent: *May 11, 2010

(54) UNSOLICITED MESSAGE DIVERTING COMMUNICATIONS PROCESSOR

(75) Inventors: Richard Paul White, Pacific Grove, CA (US); Alan Huang, Menlo Park, CA (US); Haw-minn Lu, San Diego, CA (US); Ira Victor Spivack, Reno, NV (US)

(73) Assignee: Engate Technology Corporation, Reno, NV (US)

( * ) Notice: Subject to any disclaimer, the term of this patent is extended or adjusted under 35 U.S.C. 154(b) by 1843 days.

This patent is subject to a terminal disclaimer.

(21) Appl. No.: 10/761,864

(22) Filed: Jan. 20, 2004

Related U.S. Application Data

(63) Continuation of application No. 10/238,076, filed on Sep. 9, 2002, now abandoned.

(51) Int. Cl.
*G06F 15/16* (2006.01)
*G06F 15/173* (2006.01)
(52) U.S. Cl. .................. 709/229; 709/225; 709/245
(58) Field of Classification Search ........... 709/225, 709/229, 245
See application file for complete search history.

(56) References Cited

U.S. PATENT DOCUMENTS

| | | | |
|---|---|---|---|
| 5,283,856 A | 2/1994 | Gross et al. | |
| 5,377,354 A | 12/1994 | Scannell et al. | |
| 5,619,648 A | 4/1997 | Canale et al. | |
| 5,826,022 A | 10/1998 | Nielsen | |
| 5,999,932 A | 12/1999 | Paul | |
| 6,023,723 A | 2/2000 | McCormick et al. | |
| 6,052,709 A | 4/2000 | Paul | |
| 6,112,227 A | 8/2000 | Heiner | |

(Continued)

OTHER PUBLICATIONS

Jonathan B. Postel, Simple Mail Transfer Protocol (RFC 821), Aug. 1982, Information Sciences Institute of the University of Southern California.

(Continued)

*Primary Examiner*—Paul H Kang
(74) *Attorney, Agent, or Firm*—San Diego IP Law Group LLP

(57) ABSTRACT

The spam blocker monitors the SMTP/TCP/IP conversation between a sending message transfer agent MTA_0 and a receiving message transfer agent MTA_1; catches MTA_0's IP address IP_0, MTA_0's declared domain D_0, from-address A_0; and to-address A_1; and uses this source and content based information to test for unsolicited messages. It interrupts the conversation when MTA_0 sends a RCPT command and uses the various test results to decide if the message is suspected of being unsolicited.

If the message is suspected of being unsolicited and to-address is not in the save_spam database then the spam blocker logs the rejected message, sends an error reply to MTA_0 which forces MTA_0 to terminate the connection before the body of the message is transmitted. If the message is suspected of being unsolicited and to-address is in the save_spam database then the spam blocker logs the rejected message, substitutes a diversion address A'_1 for the to-address A_1 in the RCPT command, and send the modified RCPT command to MTA_1 and allows the conversation to continue. If the message is not suspected of being unsolicited then the spam blocker logs the allowed message, releases the intercepted RCPT command which allows the conversation to continue.

15 Claims, 21 Drawing Sheets

U.S. PATENT DOCUMENTS

| | | |
|---|---|---|
| 6,199,102 B1 | 3/2001 | Cobb |
| 6,226,668 B1 | 5/2001 | Silverman |
| 6,321,267 B1 | 11/2001 | Donaldson |
| 6,460,050 B1 | 10/2002 | Pace et al. |
| 6,650,890 B1 | 11/2003 | Irlam et al. |
| 6,654,787 B1 | 11/2003 | Aronson et al. |
| 6,868,498 B1 | 3/2005 | Katsikas |
| 6,941,348 B2 | 9/2005 | Petry et al. |
| 6,965,919 B1 | 11/2005 | Woods et al. |
| 6,996,606 B2 * | 2/2006 | Hasegawa ................... 709/206 |
| 7,016,939 B1 | 3/2006 | Rothwell et al. |
| 7,146,402 B2 | 12/2006 | Kucherawy |
| 7,249,175 B1 | 7/2007 | Donaldson |
| 2002/0087641 A1 | 7/2002 | Levosky |
| 2002/0091932 A1 | 7/2002 | Shimizu et al. |
| 2002/0162025 A1 | 10/2002 | Sutton et al. |
| 2002/0181703 A1 | 12/2002 | Logan et al. |
| 2002/0199095 A1 | 12/2002 | Bandini et al. |
| 2003/0009698 A1 | 1/2003 | Lindeman et al. |
| 2003/0131063 A1 | 7/2003 | Breck |
| 2003/0167311 A1 | 9/2003 | Kirsch |
| 2003/0187942 A1 | 10/2003 | Quine |
| 2003/0200202 A1 | 10/2003 | Hsiao et al. |
| 2003/0200267 A1 | 10/2003 | Garrigues |
| 2003/0204569 A1 | 10/2003 | Andrews et al. |
| 2003/0220994 A1 | 11/2003 | Zhu |
| 2003/0231207 A1 | 12/2003 | Huang |
| 2004/0015554 A1 | 1/2004 | Wilson |
| 2004/0181571 A1 | 9/2004 | Atkinson et al. |
| 2004/0181585 A1 | 9/2004 | Atkinson et al. |
| 2008/0276318 A1 * | 11/2008 | Leung et al. ................... 726/23 |

OTHER PUBLICATIONS

Elisa Batista, When You Send Spam to Yourself, Wired, Jul. 2000.

* cited by examiner

CONNECTION ESTABLISHMENT
　S: 220
　F: 421

HELO
　S: 250
　E: 500, 501, 504, 421

MAIL
　S: 250
　F: 552, 451, 452
　E: 500, 501, 421

RCPT
　S: 250, 251
　F: 550, 551, 552, 553, 450, 451, 452
　E: 500, 501, 503, 421

DATA
　I: 354 -> data -> S: 250
　　　　　F: 552, 554, 451, 452
　F: 451, 554
　E: 500, 501, 503, 421

RSET
　S: 250
　E: 500, 501, 504, 421

SEND
　S: 250
　F: 552, 451, 452
　E: 500, 501, 502, 421

SOML
　S: 250
　F: 552, 451, 452
　E: 500, 501, 502, 421

SAML
　S: 250
　F: 552, 451, 452
　E: 500, 501, 502, 421

VRFY
　S: 250, 251
　F: 550, 551, 553
　E: 500, 501, 502, 504, 421

EXPN
　S: 250
　F: 550
　E: 500, 501, 502, 504, 421

HELP
　S: 211, 214
　E: 500, 501, 502, 504, 421

NOOP
　S: 250
　E: 500, 421

QUIT
　S: 221
　E: 500

TURN
　S: 250
　F: 502
　E: 500, 503

Fig. 3 (prior art)

214 Help message

[Information on how to use the receiver or the meaning of a particular non-standard command;

this reply is useful only to the human user]

220 <domain> Service ready

221 <domain> Service closing transmission channel

250 Requested mail action okay, completed

251 User not local; will forward to <forward-path>

354 Start mail input; end with <CRLF>.<CRLF>

421 <domain> Service not available, closing transmission channel

[This may be a reply to any command if the service knows must shut down]

450 Requested mail action not taken: mailbox unavailable [E.g., mailbox busy]

451 Requested action aborted: local error in processing

452 Requested action not taken: insufficient system storage

500 Syntax error, command unrecognized [This may include errors such as command line too long]

501 Syntax error in parameters or arguments

502 Command not implemented

503 Bad sequence of commands

504 Command parameter not implemented

550 Requested action not taken: mailbox unavailable [E.g., mailbox not found, no access]

551 User not local; please try <forward-path>

552 Requested mail action aborted: exceeded storage allocation

553 Requested action not taken: mailbox name not allowed [E.g., mailbox syntax incorrect]

554 Transaction failed

Fig. 4 (prior art)

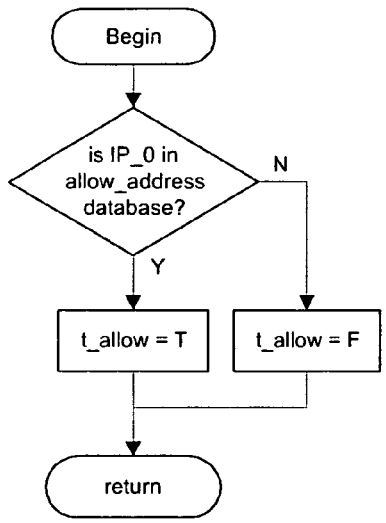
Fig. 12A
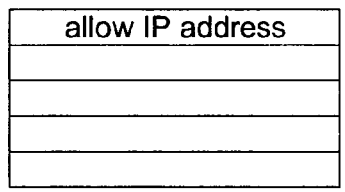
Fig. 12B
| 66.75.160.12 | 65.54.232.7 | 64.4.55.7 | 64.4.50.7 |
| 65.54.254.145 | 64.4.56.135 | 64.4.55.135 | 64.4.49.199 |
| 65.54.232.71 | 64.4.55.71 | 64.4.50.71 | 64.4.49.135 |
Fig. 12C

| low prevent address | high prevent IP address |
|---|---|
|  |  |
|  |  |
|  |  |
|  |  |

| | | | |
|---|---|---|---|
| 4.19.93.159 | 12.237.79.6 | 64.3.236.18 | 66.75.*.* |
| 4.43.46.14 | 61.16.2.72 | 65.171.144.13 | 128.121.16.241 |
| 4.43.46.15 | 63.162.162.157 | 65.174.29.52 | 128.121.16.248 |
| 4.43.46.17 | 63.163.139.83 | 65.211.149.230 | 129.71.235.57 |
| 12.101.140.178 | 64.0.241.210 | 65.88.90.10 | 131.161.40.61 |
| 12.101.199.26 | 64.14.127.28 | 66.115.47.112 | 139.130.177.67 |
| 12.101.61.98 | 64.159.91.198 | 66.115.47.144 | 146.243.16.156 |
| 12.109.16.67 | 64.251.16.152 | 66.123.51.203 | 148.235.134.146 |
| 12.129.205.65 | 64.251.16.153 | 66.47.187.38 | 148.235.89.20 |
| 12.129.205.84 | 64.251.16.154 | 66.74.*.* | |

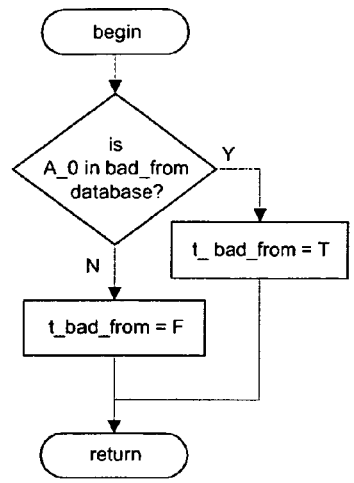
Fig. 16A
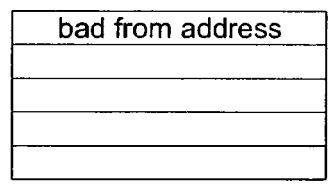
Fig. 16B
| | | |
|---|---|---|
| *@*.cl | *@*barota.com | *@*.br |
| *@thejanusgroup.com | *@*.nl | *@*agoramail.net |
| *@*nymphos* | *@netpaloffers.com | ipas@* |
| *@*ramshack.net | *@*.no | *@yourmailsource.com |
| *@freegasdaily.com | *@*porn* | fuck*.* |
| *@*emailsvc.net | *@*mercadobr.com | *fuck*.* |
| *@*bbwgroup.com | *@*medianetgroup.net | *@*.in |
| *@*hostingcheck.com | *@*myrealbox.com | |
| *@*linksynergy.com | *@*aweber.com | |
Fig. 16C

| yes_filter addresses (A_1) |
|---|
|  |
|  |
|  |
|  |

Fig. 20B

| time | "To" address (A_1) |
|---|---|
|  |  |
|  |  |
|  |  |
|  |  |

Fig. 21

| time | "To" address (A_1) | "From" address (A_0) | reason for rejection |
|---|---|---|---|
|  |  |  |  |
|  |  |  |  |
|  |  |  |  |
|  |  |  |  |

Fig. 22

| to-address (A_1) | save spam? (Y/N) |
|---|---|
|  |  |
|  |  |
|  |  |
|  |  |

Fig. 23

| to-address (A_1) | diversion address (A'_1) |
|---|---|
|  |  |
|  |  |
|  |  |
|  |  |

Fig. 24

UNSOLICITED MESSAGE DIVERTING COMMUNICATIONS PROCESSOR

RELATED APPLICATIONS INFORMATION

This application is a continuation of application Ser. No. 10/238,076 entitled "An Unsolicited Message Diverting Communications," filed on Sep. 9, 2002, which is incorporated herein by reference in its entirety.

This invention is related to co-pending applications, application Ser. No. 10/238,812 entitled "An Unsolicited Message Rejecting Communications Processor," filed on Sep. 9, 2002 by the same inventors and application Ser. No. 10/238,216 entitled "An Unsolicited Message, Intercepting Communications Processor," filed on Sep. 9, 2002 by the same inventors.

BACKGROUND OF THE INVENTION

1. Field of the Inventions

This invention blocks unsolicited e-mail messages, commonly known as SPAM, from a client's e-mail server; while reducing Internet traffic, local server to client traffic, and local storage.

2. Background Information

E-mail has become an important means of communications. Unfortunately, unsolicited e-mail messages, commonly referred to as SPAM, is cluttering this communications channel. This unsolicited e-mail wastes Internet bandwidth, local area network bandwidth, and storage. This translates into lost productivity, increased computing and increased communication costs. Some of this unsolicited e-mail is also offensive and inappropriate for non-adult audiences.

The spammer collects a list of e-mail address, append these addresses to their message, and queues these messages on their e-mail server (message transfer agent), 2, in FIG. 1. He then connects their e-mail server to the Internet, 1, via in a rogue Internet service provider, a dial-up connection, a digital scriber loop (DSL) connection, or a cable modem connection and sends out their message to the gateway message transfer agents, 5, associated with each e-mail address. These gateway message transfer agent either stores the message in an e-mail mailbox associated with the client, 3, or forwards the message to a another message transfer agent (MTA) on the same local area network.

There are four basic approaches to trying to detect junk e-mail messages. One approach used a community set of rules to determine whether or not a message is spam. This approach is used in Razor, an open source Linux solution, and by companies such as CloudMark (based on Razor) and SpamNet. The problem is a community of users to agree on a common set of rules.

A second approach uses a set of rule base filters which are periodically updated by the provider and downloaded by the client to determine whether or not a message is spam. The problem is that the set of rules have to be updated and downloaded periodically.

A third approach uses a set of permissions to determine whether or not a message is spam. The problem is that it is not possible for somebody not on user's permission list to send a message to the user.

A fourth approach uses a "whitelist" and a "blacklist" to determine whether or not a message is spam. The problem is that the spammers are constantly changing their return address and declared domain names.

There are three basic ways of implementing these approaches. One implementation approach is in the Message transfer agent. This approach add some rules to the MTA. The problem is that the MTA program is complicated and inflexible. This limits the kind of rules that can be implemented.

A second implementation approach involves placing the filters between the e-mail client and the Message Transfer Agent. The problem is that some of the information which can be used to help determine whether or not a message is spam is lost or buried.

A third implementation approach involves adding some filters to the e-mail client, Mail User Agent (MUA). The problem is that the e-mail client add-in interface is not an open standard. This leads to compatibility problems.

A problem with these approaches is that they are "reactive." The spam has already been received by the server and relayed via a local area network to client's computer. The spam message has already consumed the server's Internet bandwidth, local area network bandwidth, and client storage.

Another problem with these approaches is that they are based on the from-address, subject line, or message body; all of which can be easily forged or changed.

OBJECTS AND ADVANTAGES

Accordingly, the several objects and advantages of my invention are:

a) to provide a procedure which eliminates unsolicited messages from a client's e-mail mailbox;
b) to provide a procedure which reduces the amount of the client's Internet bandwidth consumed by unsolicited messages;
c) to provide a procedure which reduces the amount of communications bandwidth between a client's message transfer agent and mail user agent consumed by unsolicited messages;
d) to provide a procedure which reduces the amount of storage consumed by unsolicited messages;
e) to provide a procedure which uses information which can not be forged to improve the ability to block unsolicited messages;
f) to provide a procedure which avoids the need for users to install software on their individual system;
g) to provide a procedure which eliminates any need to change the client's current message transfer agent;
h) to provide a procedure which logs the messages which have been allowed;
i) to provide a procedure which logs the messages which have been rejected;
j) to provide a procedure which allows users to select the ability to not block unsolicited messages;
k) to provide a procedure which allows users to select the ability to block unsolicited messages;
l) to provide a procedure which allows users to divert unsolicited messages;
m) to provide a procedure which gives feedback to the sender of a blocked message;
n) to provide a procedure for diverting unsolicited messages which is scalable; and
o) to provide a procedure for diverting unsolicited messages which is failsafe.

Further objects and advantages of our invention will become apparent from a consideration of the drawings and ensuing description.

SUMMARY OF THE INVENTION

The spam blocker monitors the SMTP/TCP/IP conversation between a sending message transfer agent MTA_0 and a receiving message transfer agent MTA_1 and catches the IP address IP_0 of MTA_0; the declared domain D_0 of MTA_0; the from-address A_0; and the to-address A_1.

The spam blocker uses the captured information to run various source and content based tests. IP_0 is used to query a DNS server for the real domain name DD_0. DD_0 is tested to see if it is "no name." IP_0 is tested to see if it is in a open relay database. IP_0 is tested to see if it is not in a allow address database. IP_0 is tested to see if it is in a prevent_address database. DD_0 and MTA_1's domain name D_1 are tested to see if they match. D_0 is tested to see if it does not match DD_0 and if D_0 is in the suspect_domain database. A_0 is tested to see if any portion of it is in the bad_from database. The domain of A_0 is tested to see if does not match DD_0 and if it is in the suspect_domain database. A_1 is tested to see if it is in the no_filter database. A_1 is tested to see if it is not in the yes_filter database. A_1 is tested to see if it matches A_0.

The spam blocker interrupts the conversation between MTA_0 and MTA_1 when MTA_0 sends a RCPT command and uses the results of the various source and content based tests to decide if the message is suspected of being unsolicited.

If the message is suspected of being unsolicited and the to-address is in the save_spam database then it logs the rejected message in a rejected_connection database, looks up the diversion address A'_1 in the diversion database, substitutes A'_1 for A_1 in the RCPT command, and sends the modified RCPT command to MTA_1 and allows the conversation to proceed.

If the message is suspected of being unsolicited and the to-address is not in the save_spam database then it logs the rejected message in a rejected_connection database, and sends a permanent negative completion reply to MTA_0 which forces MTA_0 to terminate the connection before the body of the message is transmitted.

If the message is not suspected of being unsolicited the spam blocker logs the allowed message in the allowed_connection database, releases the intercepted. RCPT command, and allows the conversation between MTA_0 and MTA_1 to continue.

BRIEF DESCRIPTION OF THE DRAWINGS

FIG. 3 (prior art) shows a list of simple mail transfer protocol (SMTP) commands and their associated reply codes.

FIG. 4 (prior art) shows a list of simple mail transfer protocol (SMPT) reply codes and what they mean.

FIG. 12A shows a flowchart for the allow_address test which checks if the IP address IP_0 of the transmitting message transfer agent is in the allow_address database.

FIG. 12B shows the data structure of the allow_address database which stores the IP address of trusted message transfer agents.

FIG. 12C shows a sample of the contents of the allow_address database.

FIG. 16A shows a flowchart for the bad_from test which checks if any portion of the from-address is in the bad_from database.

FIG. 16B shows the data structure of the bad_from database which stores some portions of commonly used from-addresses used by spammers.

FIG. 16C shows a sample of the contents of the bad_from database.

FIG. 20B shows the data structure of the yes_filter database which stores the to-addresses A_1 that do want to be filtered.

FIG. 21 shows the data structure of the completed_connection database which stores the time and to-address A_1 of the message.

FIG. 22 shows the data structure of the rejected_connection database which stores the time, to-address A_1, from-address A_0, and a code which indicates the reason that the connection was rejected.

FIG. 23 shows the data structure of the save_spam database which stores the client's address A_1 and an indicator which tells if the client wishes to have their spam saved.

FIG. 24 shows the data structure of the diversion database which stores the client's address A_1 and the address to which the client wishes to divert their unsolicited messages to A'_1.

DESCRIPTION OF INVENTION

Figure 2:
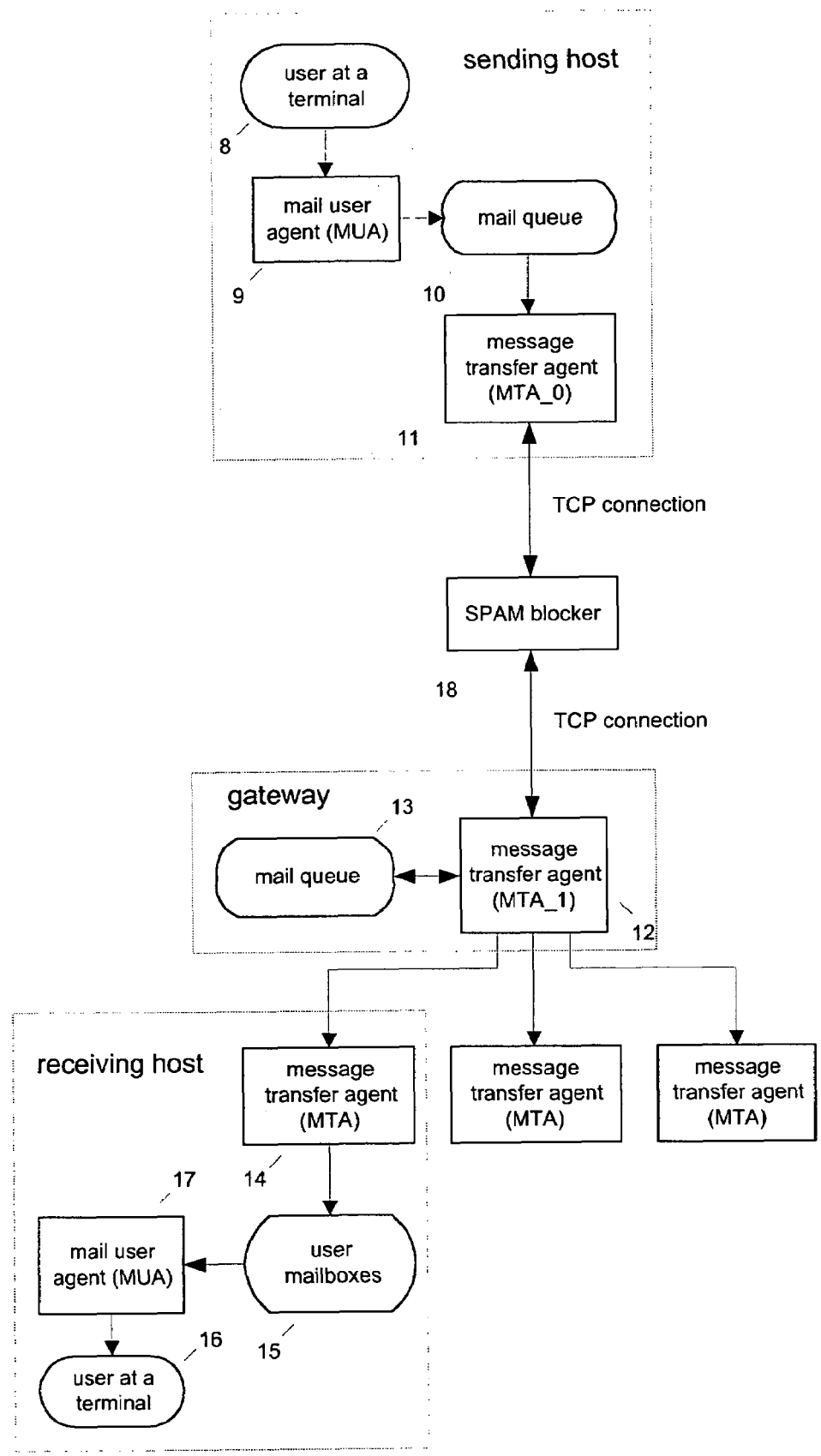
FIG. 2 shows a block diagram of a typical e-mail transfer between sending user 8, sending mail user agent 9, sending message transfer agent 11, a spam blocker 18, a receiving message transfer agent 12, a receiving local message transfer agent 14, receiving mail user agent 16, and receiving user 16.

In overview. a user, 8, in FIG. 2, sits at a terminal and types an e-mail message into a mail user agent (MUA), 9, such as Microsoft Outlook Express or Eudora. This mail message is then sent to a mail queue, 10, associated with a message transfer agent (MTA), 11, such as Unix Sendmail. MTA, 11, contacts MTA, 12, associated with the to-address of the mail message and negotiates the transfer of the queued mail message. If the negotiations are completed in a satisfactory manner, the message is transferred and stored in a queue, 13, associated with the gateway MTA, 12. MTA 12 then either stores the mail message in the user's mailbox, 15, or relays the mail message to another MTA, 14, associated with the user. The receiving user, 16, then their mail user agent (MUA), 17, to fetch the mail message from their mailbox 15.

The present invention, a spam blocker, 18, in FIG. 2, is inserted between MTA 11 and MTA 12. The spam blocker monitors the conversation between MTA 11 and MTA 12, uses some of the transferred information to decide if the message is spam, and manipulates the conversation if the message is determined to be spam. The spam blocker operates at the SMTP protocol level. This increases the accuracy of spam determination since more information is available. This reduces compatibility issues since SMTP is an established standard and since there are no in-band or other out-of-band communication channels between MTA 11 and MTA 12 to deal with. Operating at the protocol level increases the types of responses available for dealing with the unsolicited mail messages.

As mentioned previously, the operations of spam blocker is tightly coupled with the SMTP protocol. The SMTP protocol consists of a set of commands and a set of replies. The set of commands, HELO, MAIL, RCPT, DATA, RSET, SEND, SOML, SAML, VRFY, EXPN, HELP, NOOP, QUIT, and TURN is shown in FIG. 3 (prior art) and the set of replies shown in FIG. 4 (prior art) are detailed in RFC 821 (Postel 1982) and discussed in *TCP/IP Illustrated Volume* 1, *The Protocols* by W. Richards Stevens (Addison Wesley, ISBN 0-201-63346-9). The possible replies associated with each command is shown in FIG. 3. A "S" class reply indicates a successful completion of the command. A "F" class reply indicates a failure in completion of the command. A "E" class reply indicates an error in the completion of the command. A reply code beginning with a 1, 2, 3, 4, and 5 respectively indicate a positive preliminary reply, a positive completion reply, positive intermediate reply, transient negative completion reply, and permanent negative completion reply. The format of an mail message is specified in RFC 822 (Crocker 1982).

Figure 5:
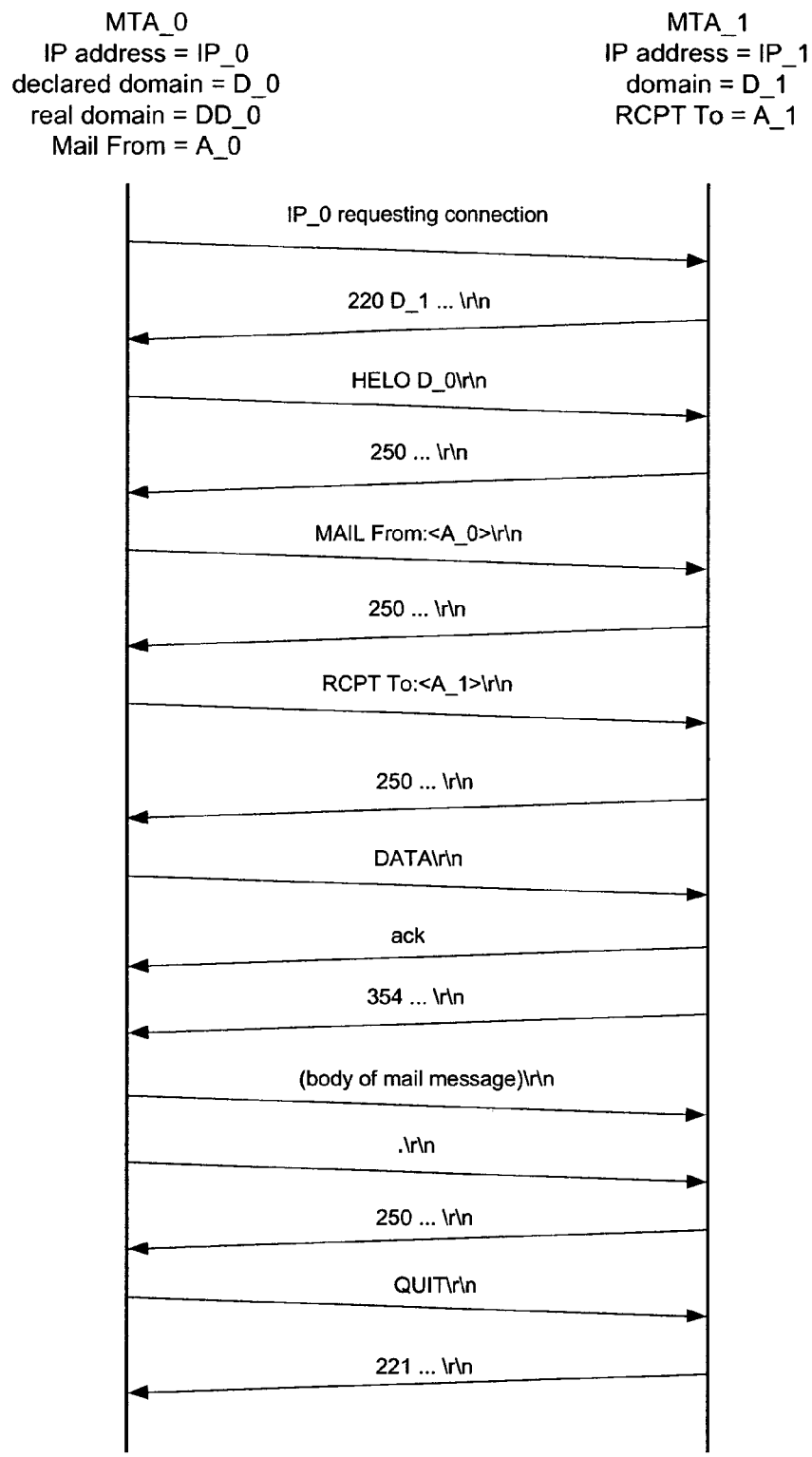
FIG. 5 (prior art) shows a timeline of a typical message transfer using the simple mail transfer protocol (SMTP).

As an example, the time line of a normal mail transfer is shown in FIG. 5 (prior art). For purposes of explanation, assume that the sending MTA 11 is called MTA_0 and has an IP address of IP_0, a declared domain name of D_0, a real domain name DD_0, and the mail message has a from-address of A_0 and that the receiving MTA 12 is called MTA_1 and has an IP address of IP_1, a domain name of D_1, and it is associated with an user mail address of A_1.

MTA_0 sends a message to MTA_1 requesting to establish a connection. MTA_1 then responds with a 220 reply which includes it's domain name D_1. MTA_0 then sends a HELO command with it's declared domain name D_0. MTA_1 then responds with a 250 reply to acknowledge the successful completion of the HELO command. MTA_0 then sends a MAIL command with a message from-address A_0. MTA_1 then sends a 250 to acknowledge the successful completion of the MAIL command. MTA_0 then sends a RCPT command with a to-address A_1. MTA_1 then sends a 250 reply to acknowledge successful completion of the RCPT command. MTA_0 then sends a DATA command. MTA_1 then sends a 354 reply to acknowledge its ability to receive the data. MTA_0 then sends the data, the body of the message. MTA_0 then sends a .\r\n to indicate the end of the data. MTA_1 then sends a 250 to acknowledge successful transfer of the data. MTA_0 then sends a QUIT command. MTA_1 then sends a 221 to acknowledge the QUIT command and closes its end of the TCP connection. Upon receipt of the 221 reply MTA_0 closes down its end of the TCP connection.

As mentioned previously, the present invention, a spam blocker, 18, in FIG. 17, is inserted between MTA_0 and MTA_1. The spam blocker monitors the conversation between MTA 11 and MTA 12, uses some of the transferred information to decide if the message is spam, and manipulates the conversation if the message is determined to be spam. For purposes of illustration, assume that the spam blocker has an IP address of IP_2 and that the MX resource record associated with D_1 has been changed to point to IP address IP_2 instead of IP_1.

Figure 6:
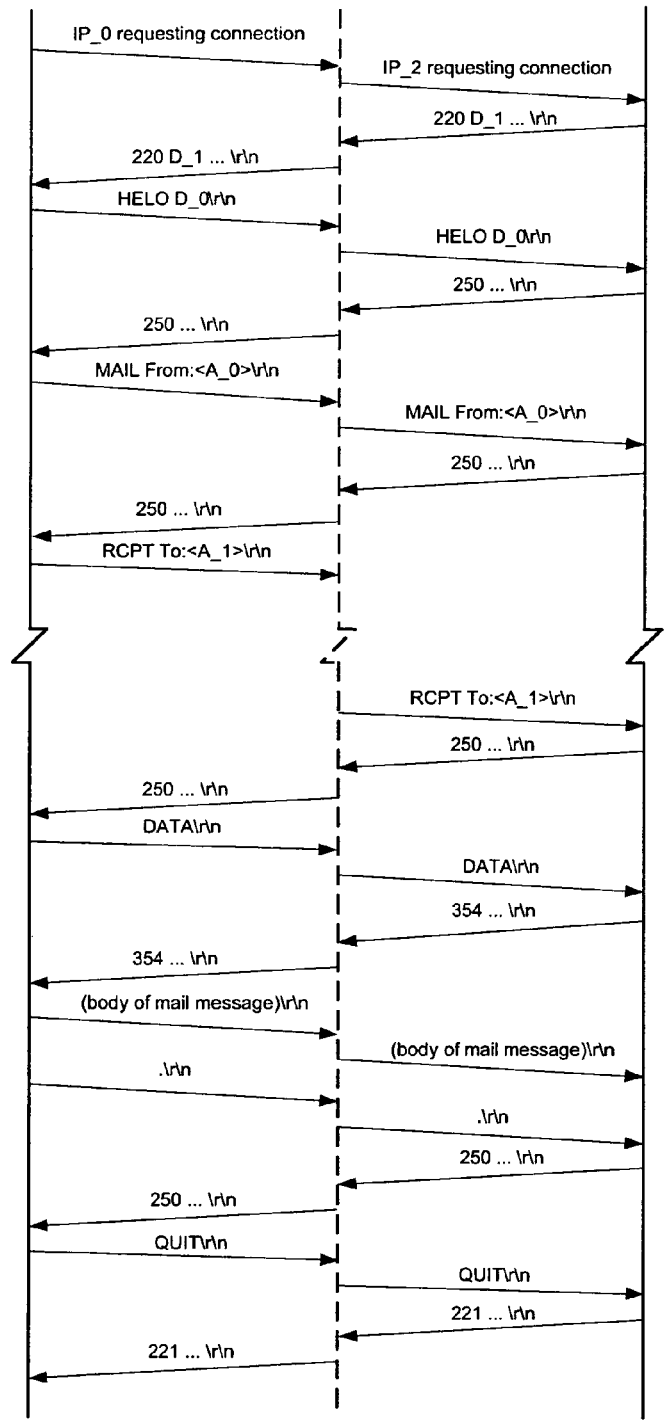
FIG. 6 shows a timeline of a modified version of the simple mail transfer protocol used to divert unsolicited messages in which the message is determined not to be spam.
Figure 7:
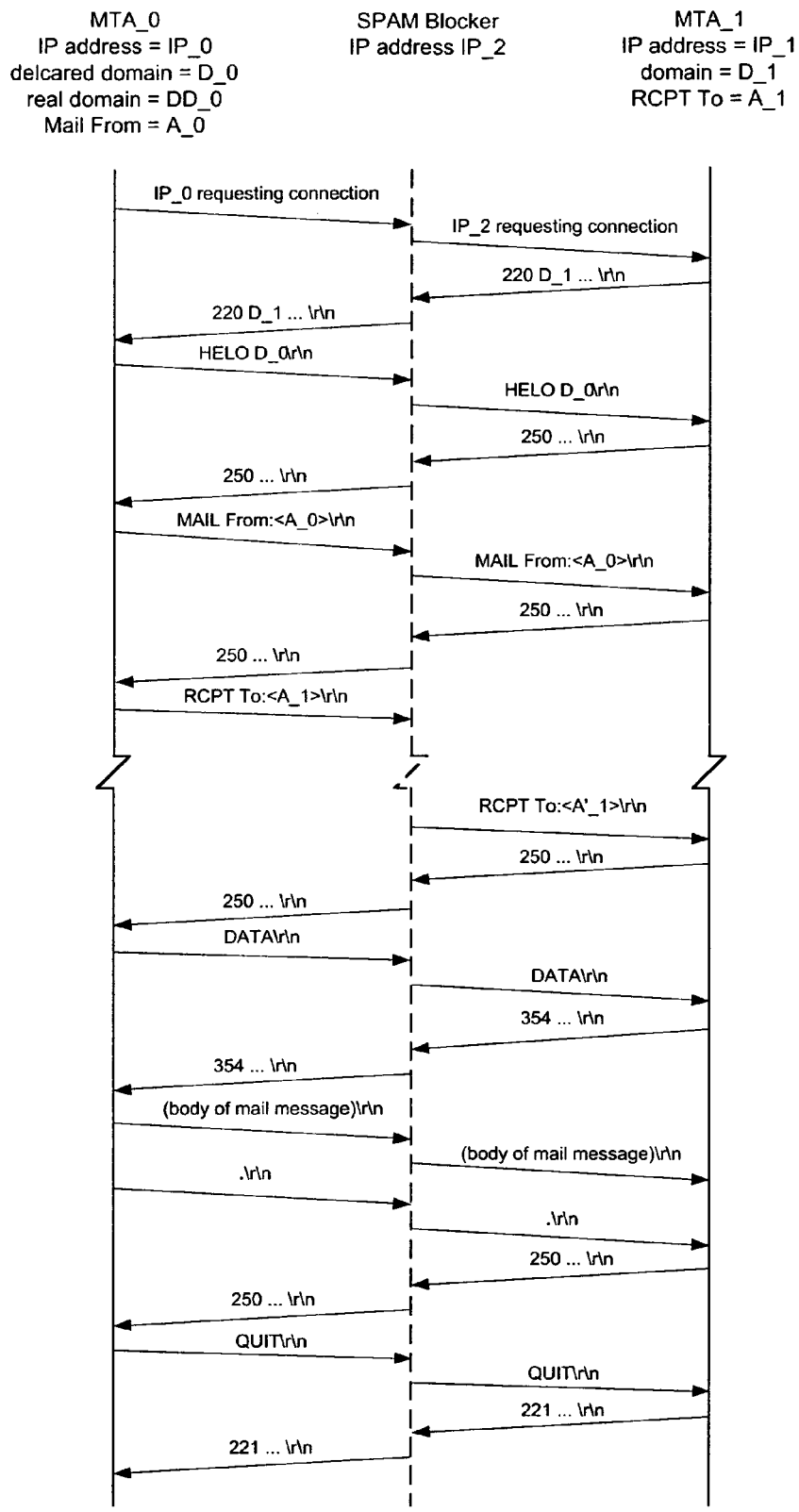
FIG. 7 shows a timeline of a modified version of the simple mail transfer protocol used to divert unsolicited messages in which the message is determined to be spam.

Time lines illustrating the interactions between MTA_0, spam blocker, and MTA_1 are shown in FIG. 6 and FIG. 7. MTA_0 begins by sending a message to D_1 requesting to establish a connection. The MX resource record directs this request to IP_2. The spam blocker at IP_2 notes the IP address IP_0 of MTA_0, relays this request to MTA_1, and performs various spam determining tests based on IP_0. MTA_1 replies with a 220 acknowledgement reply which includes its domain name D_1. The spam blocker relays this acknowledgement to MTA_0. MTA_0 then sends a HELO command which includes declared domain name of D_0. The spam blocker notes declared domain name D_0, relays this command to MTA_1, and performs various spam determining tests based on D_0. MTA_1 replies with a 250 to acknowledge successful completion of the HELO command. The spam blocker relays this reply to MTA_0. MTA_0 then sends a MAIL command which includes from-address A_0 The spam blocker notes from-address A_0, relays this command to MTA_1, and performs various spam determining tests based on A_0. MTA_1 replies with a 250 to acknowledge successful completion of the MAIL command. The spam blocker relays this reply to MTA_0. MTA_0 then sends a RCPT command which includes to-address A_1. The spam blocker notes A_1 and performs various spam determining tests based on A_1. The spam blocker then evaluates the results of the various spam determining tests to determine whether or not the message is likely to be spam.

If the message is suspected of not being spam then the interactions between MTA_0, spam blocker, and MTA_1 proceed as shown in FIG. 6. The spam blocker relays the RCPT command to MTA_1. MTA_1 replies with a 250 to acknowledge successful completion of the RCPT command. The spam blocker relays the 250 reply to MTA_0. MTA_0 then sends a DATA command. The spam blocker relays the DATA command to MTA_1. MTA_1 replies with a 354 to indicate that the mail transfer may begin. The spam blocker relays the 354 to MTA_0. MTA_0 then sends the body of the mail message. The spam blocker relays the body of the mail message to MTA_1. MTA_0 then sends a .\r\n to indicate the end of the message. The spam blocker relays the .\r\n to MTA_1. MTA_1 replies with a 250 to acknowledge receiving the end of message indicator. The spam blocker relays the 250 reply to MTA_0. MTA_0 then sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes its end to the TCP connection to MTA_1 and MTA_0. Upon receiving the 221 reply, MTA_0 closes down its end of the TCP connection.

If the message is suspected of being spam the interactions between MTA_0, spam blocker, and MTA_1 proceed as shown in FIG. 7. The spam blocker looks in the save_spam database shown in FIG. 23 to see if the user wishes to save the spam. If the user wishes to save the spam then the spam blocker looks up a diversion address in the diversion database shown in FIG. 24 to get diversion address A'_1; substitutes the diversion address A'_1 for the to-address A_1 in the RCPT command; and sends the modified RCPT command to MTA_1. MTA_1 replies with a 250 to acknowledge successful completion of the RCPT command. The spam blocker relays the 250 reply to MTA_0. MTA_0 then sends a DATA command. The spam blocker relays the DATA command to MTA_1. MTA_1 replies with a 354 to indicate that the mail transfer may begin. The spam blocker relays the 354 to MTA_0. MTA_0 then sends the body of the mail message. The spam blocker relays the body of the mail message to MTA_1. MTA_0 then sends a .\r\n to indicate the end of the message. The spam blocker relays the .\r\n to MTA_1. MTA_1 replies with a 250 to acknowledge receiving the end of message indicator. The spam blocker relays the 250 reply to MTA_0. MTA_0 then sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes down its end of the TCP connection to MTA_1 and MTA_0. Upon receiving the 221 reply, MTA_0 closes down its end of the TCP connection.

If the message is suspected of being spam the interactions between MTA_0, spam blocker, and MTA_1 proceed as shown in FIG. 7. The spam blocker looks in the save_spam database shown in FIG. 23 to see if the user wishes to save the spam. If the user does not wish to save the spam then the spam blocker sends a 550 error reply to MTA_0. MTA_0 replies to the 550 error reply with a QUIT command. The spam blocker relays the QUIT command to MTA_1. MTA_1 replies with a 221 and closes its end of the TCP connection. The spam blocker relays 221 reply to MTA_0 and closes down its end of the TCP connections to MTA_1 and MTA_0. Upon receiving the 221 reply MTA_0 closes down its end of the TCP connection.

It should be noted that the spam blocker terminates the connection with MTA_0 before the body of the message is transferred. This saves Internet bandwidth, server-client bandwidth, and local storage. It should be noted that in the case where the message is determined not to be spam, the interactions between MTA_0 and MTA_1 as shown in FIG. 6 are functionally equivalent to the normal interactions between MTA_0 and MTA_1 as shown in FIG. 3 (prior art). This improves compatibility. It should be noted that until receipt of the RCPT command by the spam blocker, MTA_1 has full control of the replies to MTA_0's commands. This also improves compatibility.

Figure 8A:
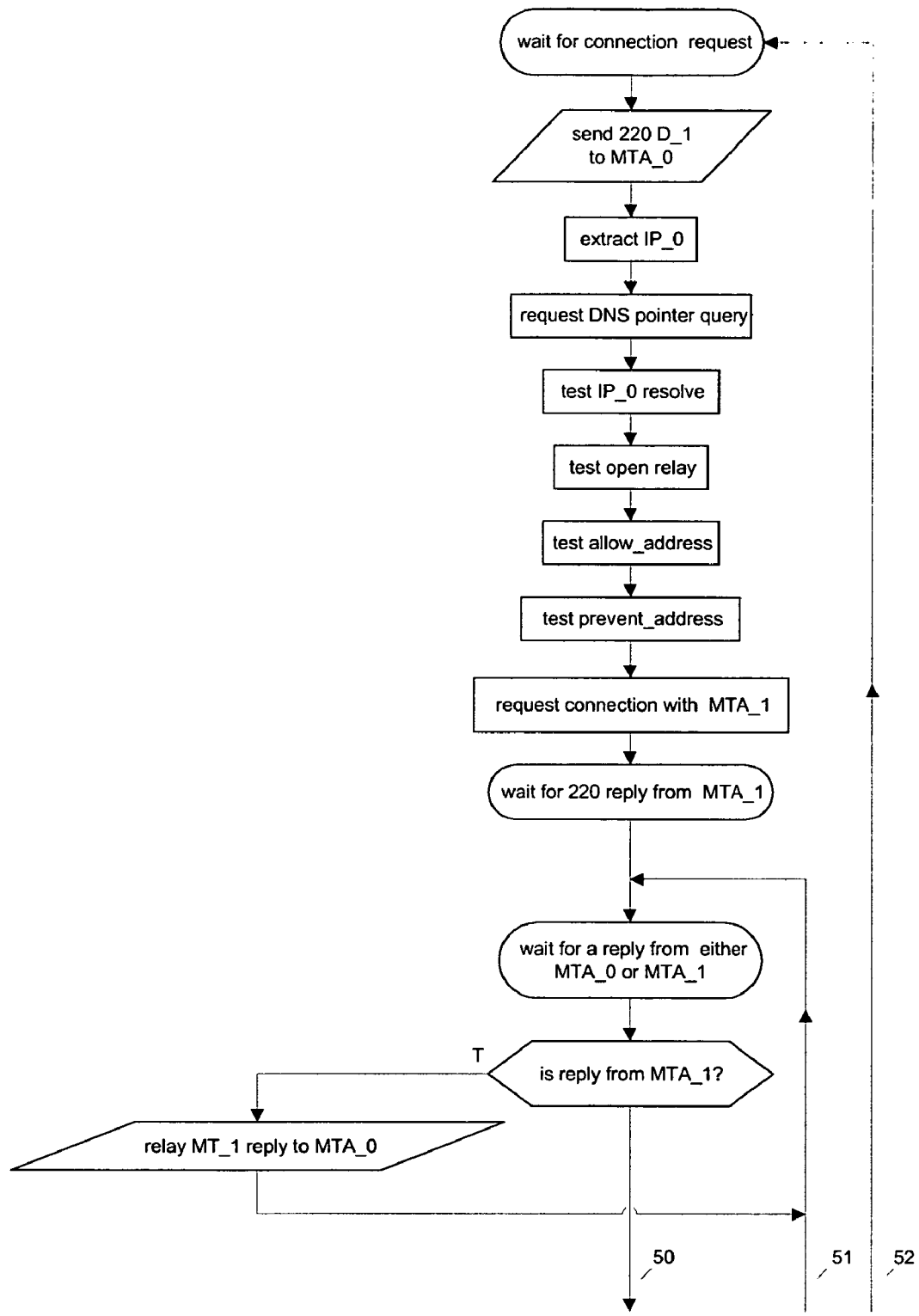
FIGS. 8A-8F shows a flowchart of the spam blocking algorithm used to reject unsolicited messages.
Figure 8B:
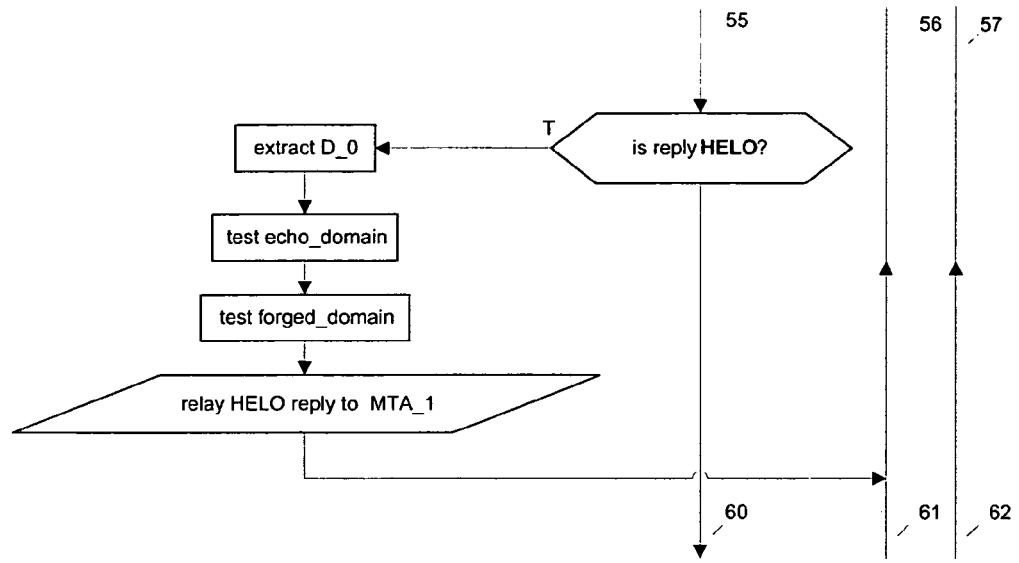
Figure 8C:
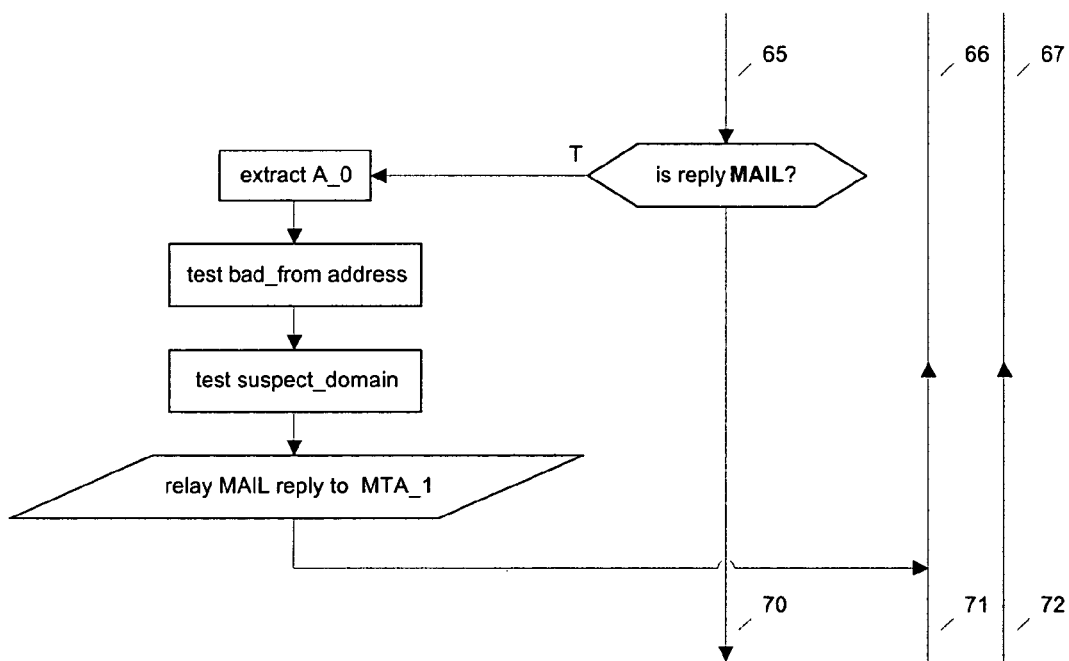
Figure 8D:
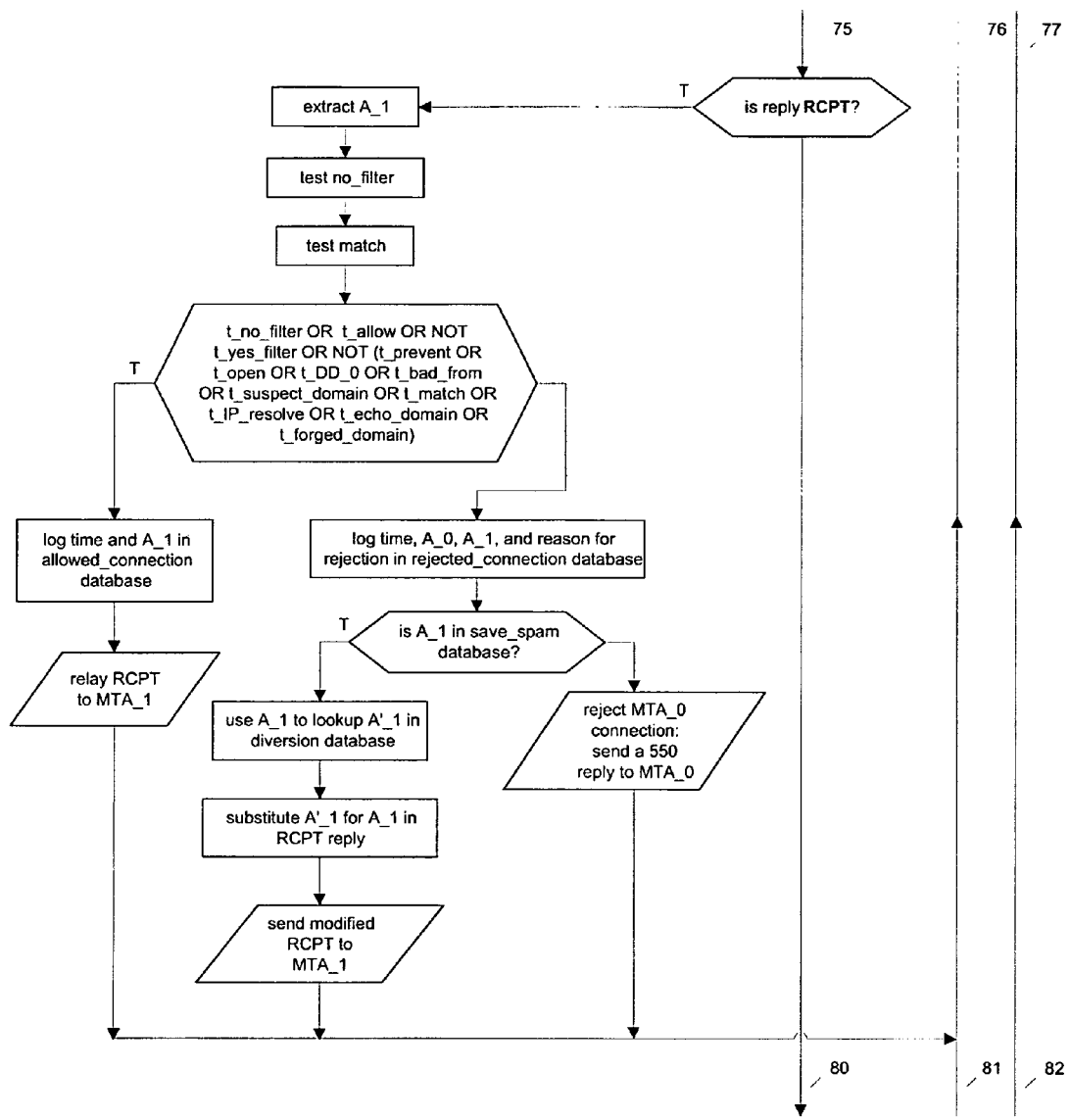
Figure 8E:
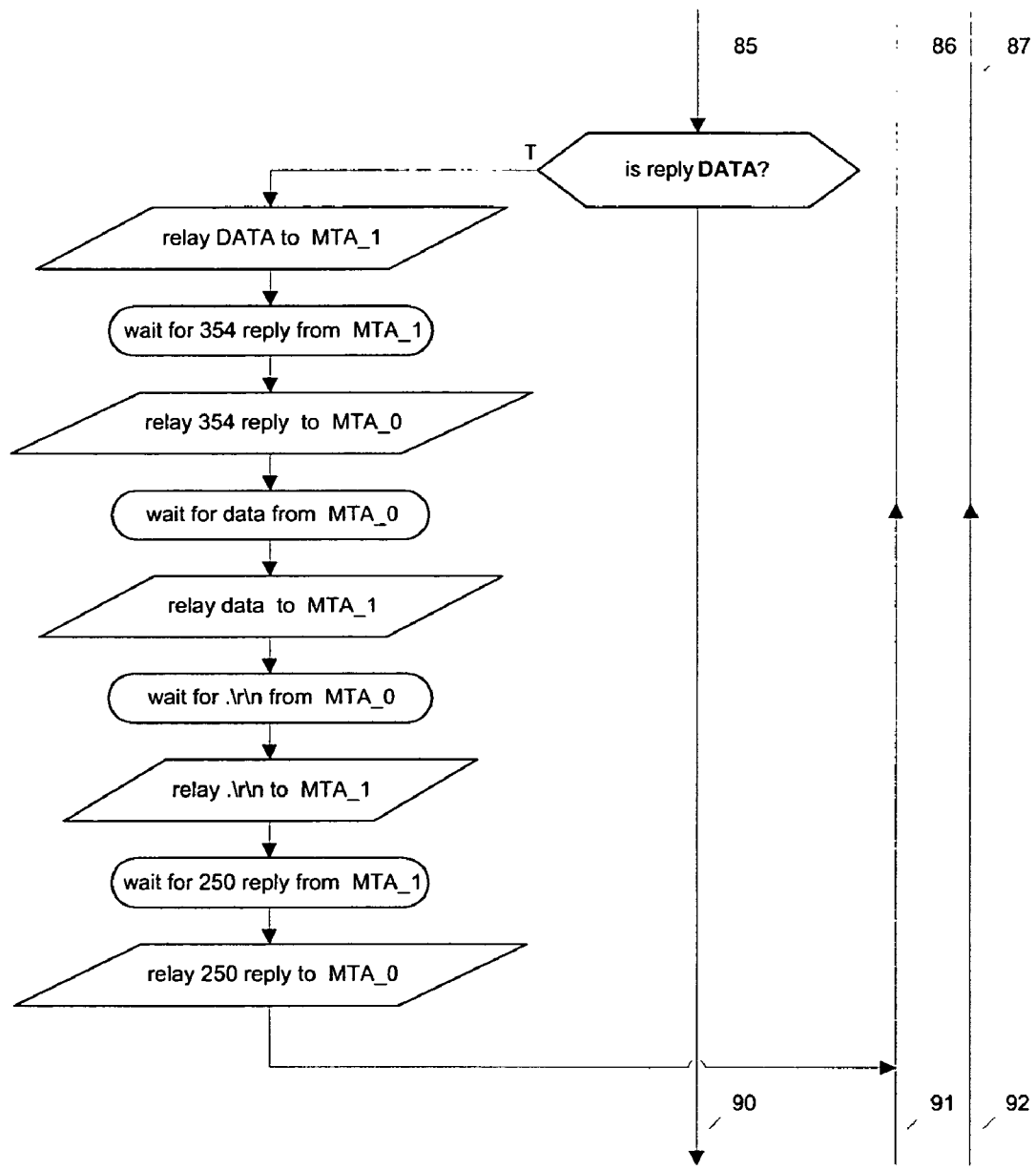

The algorithm which implements the spam blocker is shown in FIGS. 8A, 8B, 8C, 8D, 8E, and 8F. Connections 50, 51, and 52 in FIG. 8A are respectively connected to connections 55, 56, and 57 in FIG. 8B. Connections 60, 61, and 62 in FIG. 8B are respectively connected to connections 65, 66, and 67 in FIG. 8C. Connections 70, 71, and 72 in FIG. 8C are respectively connected to connections 75, 76, and 77 in FIG. 8D. Connections 80, 81, and 82 in FIG. 8D are respectively connected to connections 85, 86, 87 in FIG. 8E. Connections 90, 91, and 92 in FIG. 8E are respectively connected to connections 95, 96, and 97 in FIG. 8F.

The algorithm begins in FIG. 8A by waiting for a connection establishment request. Upon receipt of such a request it extracts MTA_0's IP address IP_0. It then sends a 220 reply with a D_1 domain name to MTA_0. It then requests a domain name server (DNS) pointer query. It performs a IP_0_resolve test, an open relay test, an allow_address, and a prevent_address test. It then request a connection with MTA_1 and waits for a 220 reply from MTA_1. It then waits for a reply from either MTA_0 or MTA_1. It should be noted that IP_0 is an important address since it cannot be forged. If IP_0 is forged then the 220 reply will not be sent to MTA_0's correct IP address, MTA_0 will not receive the 220 reply, and the requested connection will not be established.

If the reply is from MTA_1 it relays the reply to MTA_0 and waits for a new reply.

If the reply is a HELO command as shown in FIG. 8B then the algorithm extracts MTA_0's declared domain D_0. It then performs an echo_domain and forged_domain tests. It then relays the HELO reply to MTA_1 and waits for another reply.

If the reply is a MAIL command as shown in FIG. 8C then the algorithm extracts from-address A_0. The algorithm then performs the bad_from and the suspect_domain tests. It then relays the MAIL command to MTA_1 and waits for another reply.

If the reply is a RCPT command as shown in FIG. 8D then the algorithm extracts to-address A_1. It then performs the no_filter, the yes_filter, and the to_from tests. It then uses the results of the various test to determine if the message is suspected of being spam. In this version of the algorithm the decision equation used is t_allow OR t_no_filter OR NOT t_yes_filter OR NOT (t_prevent OR t_open_relay OR t_IP_resolve OR t_bad_from OR t_suspect_domain OR t_to_from OR t_echo_domain OR t_forged_domain).

If the decision equation is determined to be true then the message is allowed and the time and to-address is entered in the allowed_connection database. The structure of the allow-_connection database is shown in FIG. 21. It is anticipated that this database will be used for statistical and billing purposes. The from-address A_0 could be included if privacy issues are not of concern. It then relays the RCPT command to MTA_1 and waits for a new reply.

If the decision equation is determined to be false and the to-address A_1 is not in the save_spam database then the message is not allowed and the time, from-address A_0, to-address A_1, and a reason for the rejection is entered into a rejected_connection database.

The algorithm then rejects the MTA_0 connection by sending a 550 error reply to MTA_0, and waits for a new reply. The data structure of the rejected_connection database is shown in FIG. 22. It is anticipated that this database will be used for statistical and billing purposes. The data structure of the save_spam database is shown in FIG. 23.

If the decision equation is determined to be false and the to-address A_1 is in the save_spam database then the message is not allowed and the time, from-address A_0, to-address A_1, and a reason for the rejection is entered into a rejected-_connection database. The algorithm then looks up the diversion address A'_1 in the diversion database, substitutes A'_1 for A_1 in the RCPT command, and sends the modified RCPT command to MTA_1, and waits for a new reply.

If the reply is a DATA command as shown in FIG. 8E then the algorithm relays the DATA command to MTA_1, waits for a 354 reply form MTA_1, and relays the 354 reply to Mta_0. It then waits for data from MTA_0, relays this data to MTA_1, waits for a .\r\n end of data indicator from MTA_0, relays the .\r\n to MTA_1, waits for a 250 reply from MTA_1 to acknowledge the successful transfer of the data, and then relays the 250 reply to MTA_0 and waits for a new reply.

Figure 8F:
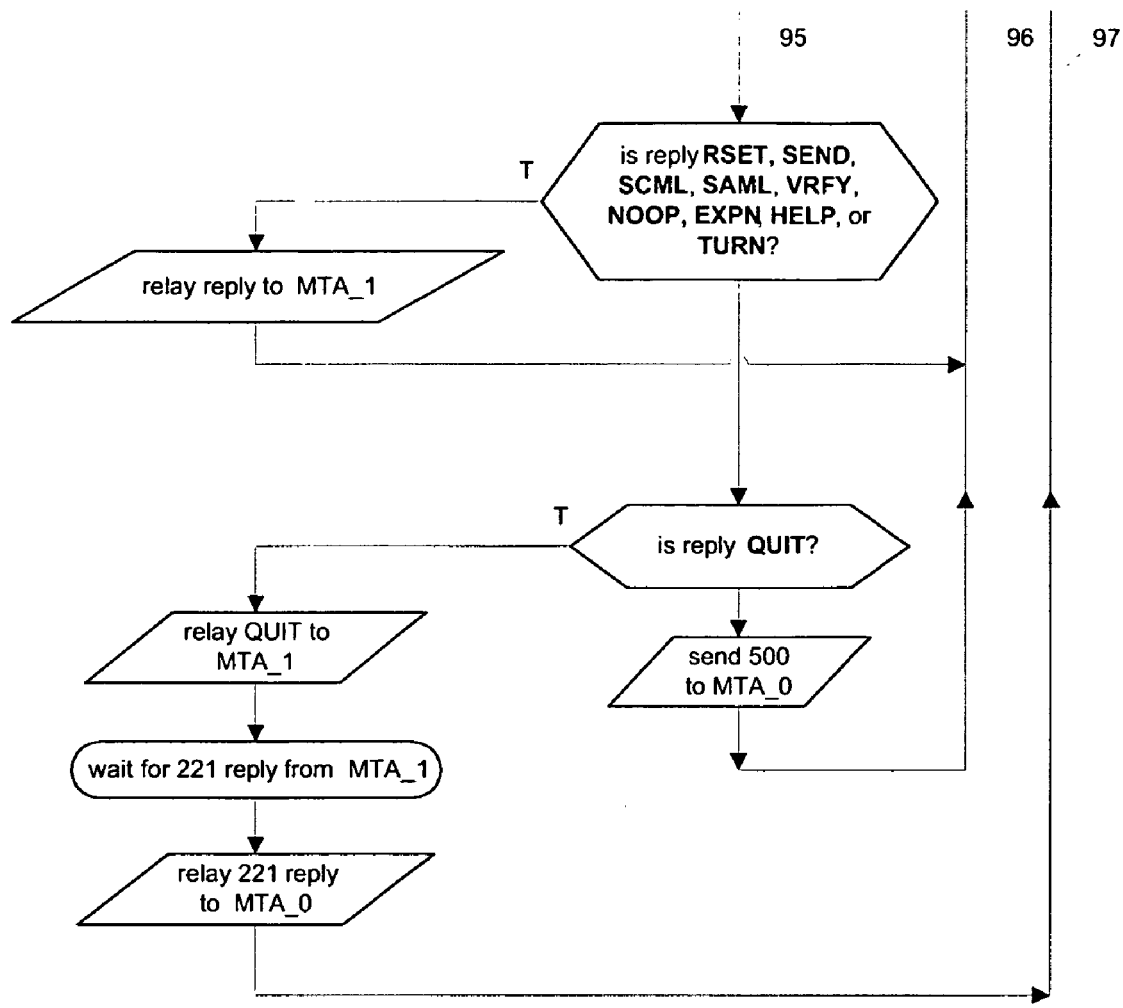

If the reply is a RSET, SEND, SCML, SAML, VRFY, NOOP, EXPN, HELP, or TURN command as shown in FIG. 8F then the algorithm relays the reply to MTA_1 and waits for a new reply.

If the reply is a QUIT command as shown in FIG. 8F then the algorithm relays the QUIT command to MTA_1, waits for a 221 reply from MTA_1 to acknowledge the QUIT command, relays the 221 reply to MTA_0, closes its end of the TCP connection with both MTA_1 and MTA_0, and then waits for a new connection request.

If the reply is not a QUIT command then this is invalid command error and the algorithm sends a 500 to MTA_0 and waits for a new reply.

Figure 9:
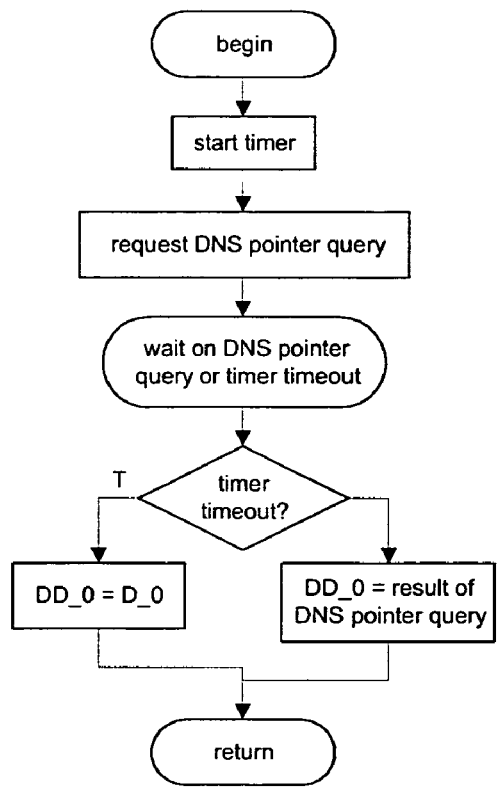
FIG. 9 shows a flowchart for a domain name server (DNS) database server query to fetch the domain name associated with a IP address IP_0 of the sending message transfer agent.

The algorithm for requesting the domain name server (DNS) pointer query in FIG. 8B is shown in FIG. 9. The algorithm begins by starting a timer. It then sends out a pointer query to a DNS server to fetch the domain name associated with IP_0. It then waits for either a reply or timer time out. If the timer times out then the real domain DD_0 is set to the declared domain D_0. If the DNS server replies with a domain name and the timer did not time out then the real domain DD_0 is set to the returned domain name. If the DNS reply indicates that it does not have a domain name associated with IP_0 and the timer did not time out then the real domain DD_0 is set to "no name."

Figure 10:
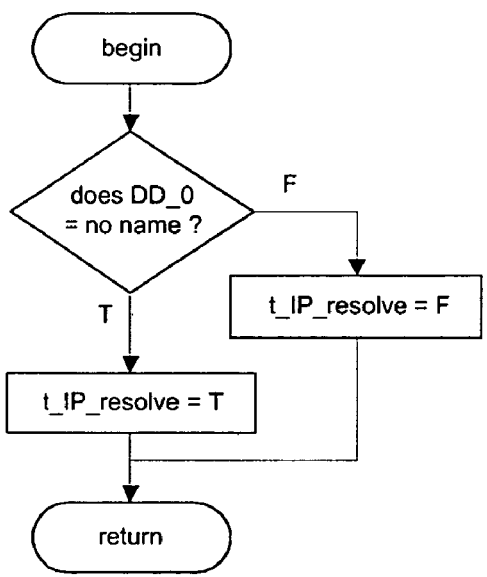
FIG. 10 shows a flowchart for the IP_resolve test which checks if DNS database has a domain name DD_0 associated with a IP address of the sending message transfer agent.

The algorithm for the IP resolve test in FIG. 8B is shown in FIG. 10. If real domain name DD_0 is "no name" then set flag t_IP_resolve to true, else set flag t_IP_resolve to false. This test is based on the fact that some spammers try to hide their domain name and do not enter a domain name in the DNS database.

Figure 1:
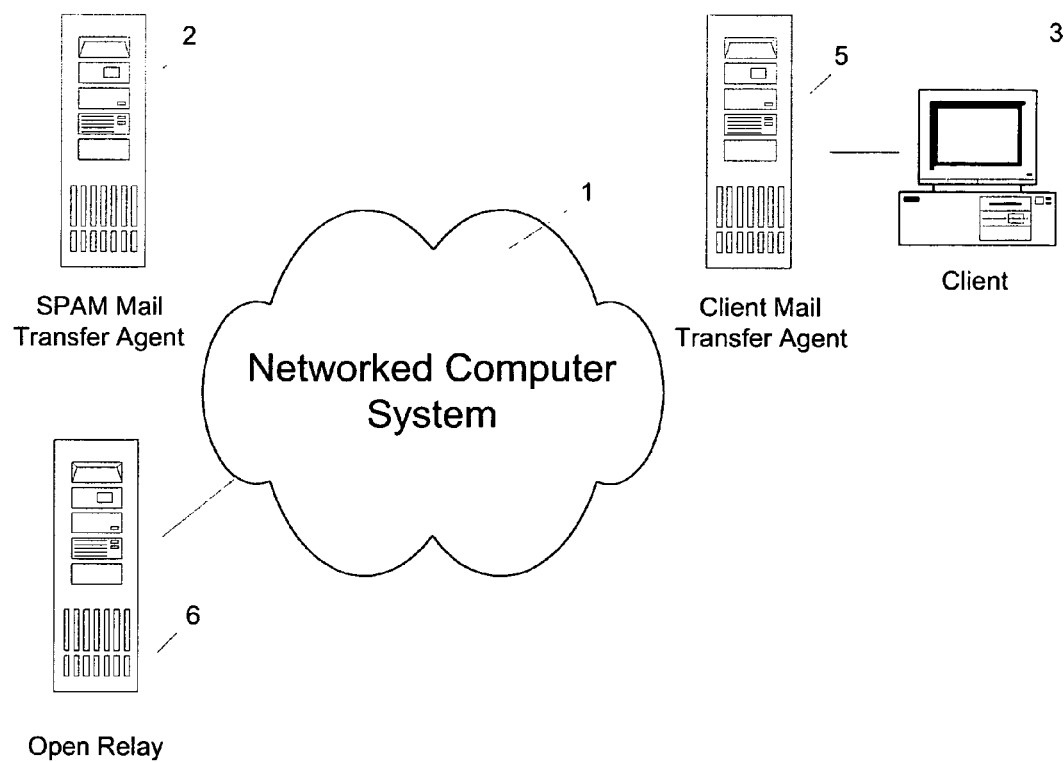
FIG. 1 (prior art) shows a overview block diagram of a networked computer system consisting of a network 1, a client, a transmitting message transfer agent 2, a receiving message transfer agent 5, and a open relay message transfer agent 6.
Figure 11:
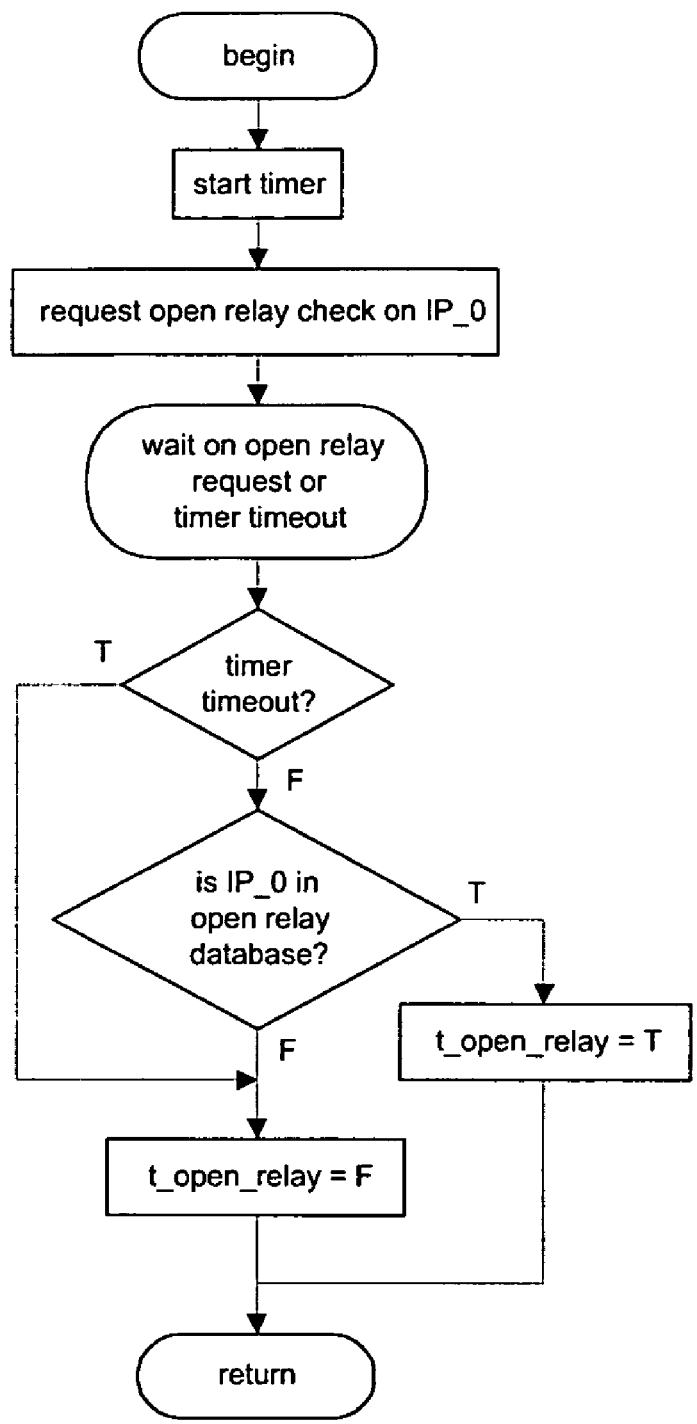
FIG. 11 shows a flowchart for the open_relay test which checks if the IP address IP_0 of the sending message transfer agent is in an open relay database.

The algorithm for the open relay test in FIG. 8B is shown in FIG. 11. The algorithm begins by starting a timer and then checking to see if IP_0 is in an open relay database, such as http://www.relays.ordb.org or http://www.relays.orisrusoft-.com. It then waits for either a reply from the open relay database or a timer time out. If the timer does time out then set flag t_open_relay to false. If IP_0 is in an open relay database and the timer does not time out then set flag t_open_relay to true, else set flag t_open_relay to false. This test is based on the fact that many spammers try to hide their real IP address by sending their spam to an open relay MTA. This is shown in FIG. 1. The spammer's MTA first sends the unsolicited message to open relay MTA, 6. Open relay MTA 6 then contacts MTA_1, 5, to relay the unsolicited message to client MTA 5. Client MTA 5 then thinks that it is receiving mail is from the open relay MTA, 6 rather than the spamming MTA, 2.

The algorithm for the allow_address test in FIG. 8B is shown in FIG. 12A. If IP_0 is in the allow_address database then set flag t_allow to true, else set flag t_allow to false. The data structure of the allow_address database is shown in FIG. 12B. This database contains the IP address of trusted message transfer agents, such as those associated with AOL, Earthlink, ATT, etc. A sample of some of the allow_address database entries is shown in FIG. 12C.

Figures 13A, 13B, 13C:
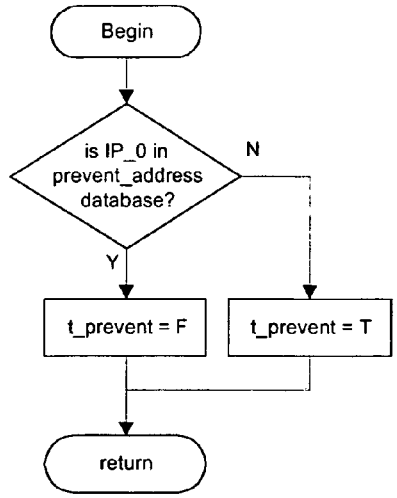
FIG. 13A shows a flowchart for the prevent_address test which checks if the IP address IP_0 of the transmitting message transfer agent is in the prevent_address database.
FIG. 13B shows the data structure of the prevent_address database which stores the IP addresses IP_0 of known spammers and of dial-in, digital scriber loop, and cable modem accounts from which a legal message transfer agent should not be operating.
FIG. 13C shows a sample of the contents of the prevent_address database.

The algorithm for the prevent_address test in FIG. 8B is shown in FIG. 13A. If IP_0 is in the prevent_address database then set flag t_prevent to true, else set flag t_prevent to false. The data structure of the prevent_address database is shown in FIG. 13B. This database contains the IP address of known spammers. This database also contains MTA's that are not RFC compliant, such as those listed in http://www.rfc.igno-rant.org. This database also contains blocks of suspicious IP addresses such as those associated with dial-in, digit scriber loop (DSL), and modem connections since there is no valid reason for a MTA to originate from one of these IP addresses. A sample of some of the prevent_address database entries is shown in FIG. 13C.

Figure 14:
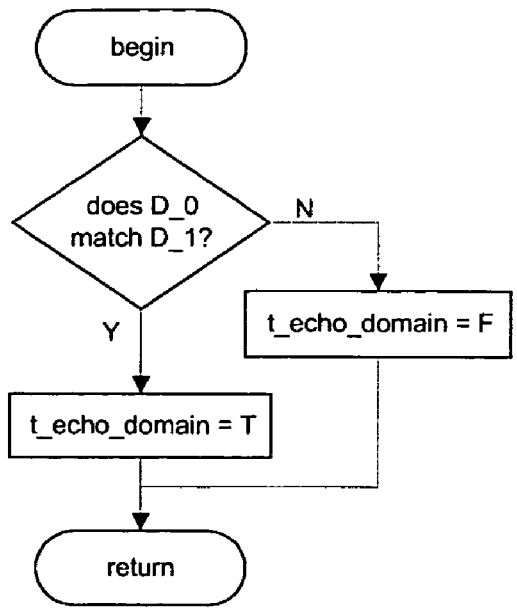
FIG. 14 shows a flowchart for the echo_domain test which checks if the declared domain D_0 matches the domain D_1 of the receiving message transfer agent.

The algorithm for the echo_domain test in FIG. 8B is shown in FIG. 14. If declared domain D_0 does match the domain D_1 of MTA_1 then set flag echo_domain to true, else set flag echo_domain to false. This test is based on the fact that some spammers set their declared domain to a domain name trusted by MTA_1.

Figure 15:
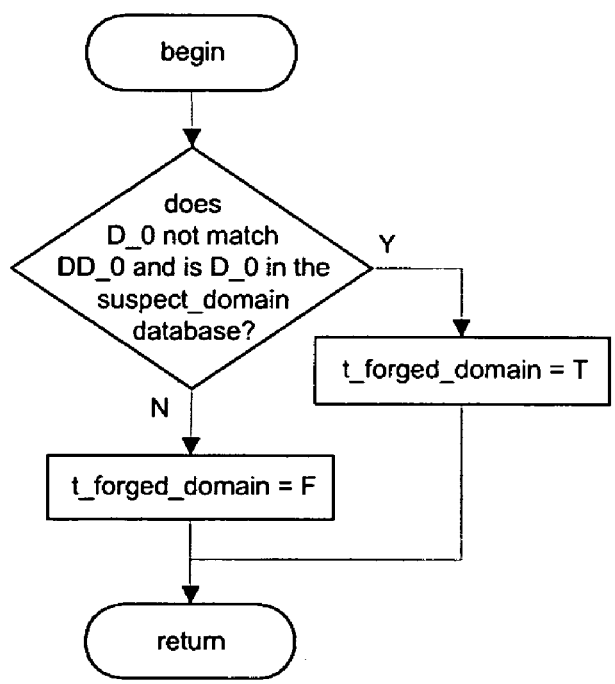
FIG. 15 shows a flowchart for the forged_domain test which checks if the declared domain D_0 does not match the real domain DD_0 of the sending message transfer agent and if the declared domain D_0 of the sending message transfer agent is in the suspect_domain database.

The algorithm for the forged_domain test in FIG. 8B is shown in FIG. 15. If the declared domain D_0 does not match the real domain name DD_0 and the declared domain D_0 is in the suspect_domain database then set flag t_forged_domain to true, else set flag t_forged_domain to false. The data structure of the suspect_domain database is shown in FIG. 17B. This test is based on the fact that some spammers hide their true domain name and assume popular domain names such as yahoo.com or hotmail.com however their declared domains D_0 does not match their real domain name DD_0.

The algorithm for the bad_from address test in FIG. 8C is shown in FIG. 16A. If A_0 is in the bad_from database then set flag t_bad_from to true, else set flag t_bad_from to false. This test is based on the fact that some spammers use variations of the same from-address for different spam messages. The data structure of the bad_from database is shown in FIG. 16B. Some examples of bad_from database entries are shown in FIG. 16C. The * symbol indicates at least one wildcard character.

Figure 17A:
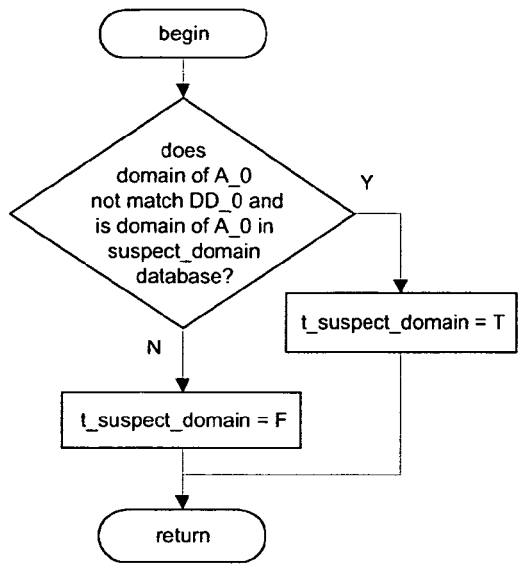
FIG. 17A shows a flowchart for the suspect_domain test which checks if the real domain DD_0 of the sending message transfer agent does not match the domain name of the from-address A_0 and domain of the from-address A_0 is in the suspect_domain database.
Figure 17B:
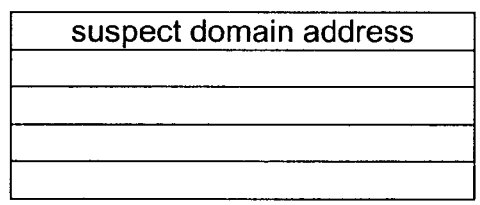
FIG. 17B shows the data structure of the suspect_domain database which stores domain names commonly forged by spammers.

The algorithm for the suspect_domain test in FIG. 8C is shown in FIG. 17A. If the real domain DD_0 does not match the domain of the from-address A_0 and the domain of the from_address A_0 is in the suspect_domain database then set flag t_suspect_domain to true, else set flag t_suspect_domain to false. The data structure of the suspect_domain database is shown in FIG. 17B. This test is based on the fact that some spammers hide their true domain name and assume popular domain names such as yahoo.com or hotmail.com however the domain of their from-address A_0 does not match their real domain name DD_0.

Figure 18:
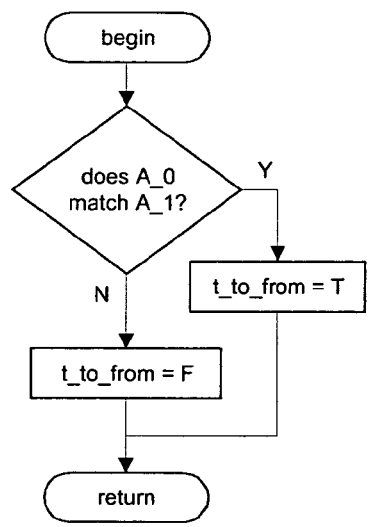
FIG. 18 shows a flowchart for the to_from test which checks if the to-address A_1 of the message matches the from-address.

The algorithm for the to_from test in FIG. 8D is shown in FIG. 18. If from-address A_0 matches to-address A_1 then set flag t_to_from to true, else set flag t_to_from to false. This test is based on the fact that some spammers try to disguise themselves as someone known to MTA_1, such as A_1.

Figure 19A:
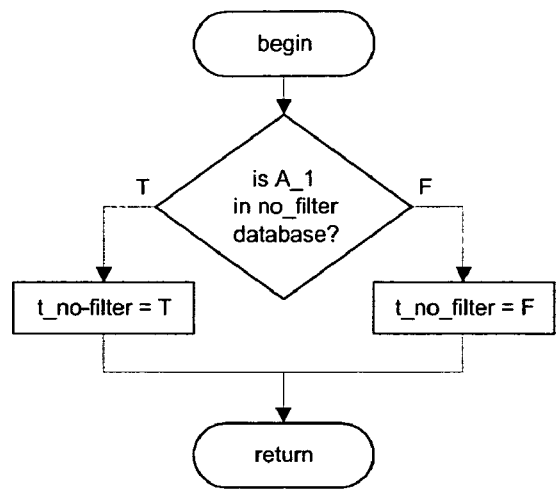
FIG. 19A shows a flowchart for the no_filter test which checks if the to-address A_1 of the message is in the no_filter database.
Figure 19B:
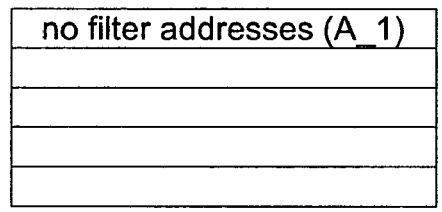
FIG. 19B shows the data structure of the no_filter database which stores the to-addresses A_1 that do not want to be filtered.

The algorithm for the no_filter test in FIG. 8D is shown in FIG. 19A. If to-address A_1 is in the no_filter database then set flag t_no_filter to true, else set flag t_no_filter to false. The data structure of the no_filter database is shown in FIG. 19B. This test is based on the fact that some users do not want their mail filtered.

Figure 20A:
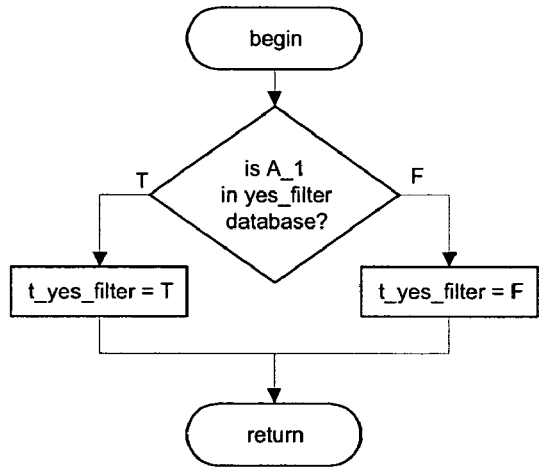
FIG. 20A shows a flowchart for the yes_filter test which checks if the to-address A_1 of the message in the yes_filter database.

The algorithm for the yes_filter test in FIG. 8D is shown in FIG. 20A. If to-address A_1 is in the yes_filter database then set flag t_yes_filter to true, else set flag t_yes_filter to false. The data structure of the yes_filter database is shown in FIG. 20B. This test is based on the fact that some users want their mail filtered.

The spam blocking process can be scaled to handle more messages by deploying more new spam blocking units each connected to a new client message transfer agent and changing the client's MX record to distribute the mail traffic among all the spam blocking units.

The spam blocking process can be made failsafe by deploying more new spam blocking units each connected to a new client message transfer agent and changing the client's MX record to distribute the mail traffic among all the spam blocking units and not to distribute mail traffic to any spam blocking unit which is off-line.

Objectives of this invention are to reduce the Internet bandwidth consumed by unsolicited messages, to reduce the communications bandwidth consumed between the client's message transfer agent and mail user agent, to reduce the amount of storage consumed by unsolicited messages, and to eliminate unsolicited messages from a client's e-mail box. This is accomplished by rejecting an unsolicited message before the body of the message is transferred to the client's message transfer agent.

Another objective of this invention is to improve the ability to detect unsolicited messages. This is accomplished by using the sending MTA's IP address, IP_0 which can not be forged. The problem is that content based tests suffer from the fact that the declared domain, from-address, subject line, or message body can easily be forged or changed. IP_0 can not be forged because a forged IP_0 would cause the receiving MTA's 220 rely to be sent to the wrong address and without a 220 reply the sending MTA would never be able to establish the requested connection. Source based tests are thus based on "bedrock" information while content based tests are based on "shifting sands." This improves the ability of the spam blocker to detect suspected unsolicited messages.

Other objectives of this invention are to avoid the need for users to install software on their individual systems and the need to change the client's current message transfer agent. This is accomplished by positioning the spam blocker between the sending and receiving message transfer agents and not between the receiving message transfer agent and the mail user agent. This is further accomplished by not positioning the spam blocker as a message transfer agent add-on or mail user agent add-on. This is further accomplished by keeping the communications between the spam blocker and the sending and receiving message transfer agents standard SMTP protocol and eliminating other in-band or out-of-band communications channels between the spam blocker and the sending message transfer agent, receiving message transfer agent, or the mail user agent.

Another objective of this invention is to log the messages that have been allowed or rejected. This is accomplished by the allow_connection and the rejected_connection databases. This is further accomplished by deferring the decision equation until after the to-address A_1 has been captured.

Another objective of this invention is to allow users to select the ability not to block unsolicited messages. This is accomplished by the no_filter test and the no_filter database. A related objective of this invention is to allow users to select the ability to block unsolicited messages. This is accomplished by the yes_filter test and the yes_filter database.

Another objective of this invention is to give feedback to the sender of a blocked message. This is accomplished by the sending a permanent negative completion reply such as a 550 reply to the sending message transfer agent if a message is determined to be unsolicited. The sending message transfer agent will then either send a error message to the sender or send the message back to the message transfer agent that sent the message. This is important since most spam blocking agents either delete or divert the spam into a junk folder and does not return an error message. The sender of a false positive spam message thus has no knowledge that the message was not been delivered.

Another objective of this invention is to allow the user to divert unsolicited messages. This is accomplished by changing the to-address to a diversion address if the message is suspected of being spam and the users desires the message to be diverted.

Other objectives of this invention are to scale the spam blocking process and to make the spam blocking process failsafe. This is accomplished by deploying more spam blocking units each connected to a client message transfer agent and changing the client's MX record to distribute the mail traffic among all the spam blocking units and not to distribute mail traffic to any spam blocking unit which is off-line.

The spam blocker algorithm as shown in FIGS. 8A-8F is structured for clarity rather efficiency. It is assumed that anyone skilled in the art can restructure spam blocker algorithm for efficiency The DNS and open relay database server time out problems can be avoided by setting up a local copies of the servers. All, none or any subset of the tests shown in FIG. 8A can be used in any order at any time before the decision equation shown in FIG. 8D. All, none, or any subset of the tests shown in FIG. 8B can be used in any order at any time before the decision equation shown in FIG. 8D. All, none, or any subset of the tests shown in FIG. 8C can be used in any order at any time before the decision equation shown in FIG. 8D. More tests can be added. The decision function has to be modified if any of the tests are not used or more tests are added. The decision equation can be deferred until MTA_1's 250 reply to the RCPT command. This still prevents the body of the message from being transmitted since the decision equation still proceeds MTA_0's DATA command. While a 550 reply was used to force MTA_0 to QUIT the connection, other 5XX permanent negative completion replies could also be used.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

We claim:

1. A networked computer comprising an unsolicited message diverting communications processor connected between mail transfer agents MTA_0 with an Internet address IP_0, a from-address A_0, a declared domain D_0, and a real domain DD_0, and MTA_1 with an Internet address IP_1, a domain D_1, a to-address A_1, a diversion address A'_1, and a save_spam database, the unsolicited message diverting communications processor comprising:
   a) monitoring means for monitoring the communications between MTA_0 and MTA_1;
   b) determining means for determining if the communications contains an unsolicited message; and
   c) intercepting means for intercepting a RCPT reply from MTA_0, substituting the diversion address A'_1 for the to-address A_1 in the RCPT reply and sending a modified RCPT reply to MTA_1 if the message is determined to be unsolicited and if the to-address A_1 is in the save_spam database;

wherein the unsolicited message diverting communications processor does not intercept communications between MTA_0 and MTA_1 before a RCPT command from MTA_0 is received by the unsolicited message diverting communications processor, and wherein the connection with MTA_0 is rejected before the data portion of the unsolicited message is transmitted.

2. The networked computer in claim 1, further includes an allow_address database and wherein the determining means determines if a message is not unsolicited by checking if the IP_0 is in the allow_address database.

3. The networked computer in claim 1, further includes a prevent_address database and wherein the determining means determines if a message is unsolicited by checking if IP_0 is in the prevent_address database.

4. The networked computer in claim 1, further includes access to an open relay database and wherein the determining means determines if a message is unsolicited by checking if IP_0 is in the open relay database.

5. The networked computer in claim 1, further includes access to a DNS (domain name server) database and wherein the determining means determines if a message is unsolicited by checking if IP_0 has a domain name entry DD_0 in the DNS database.

6. The networked computer in claim 1, further includes a bad_from database and wherein the determining means determines if a message is unsolicited by checking if the from-address A_0 is in the bad_from database.

7. The networked computer in claim 1, further includes a suspect_domain database and wherein the determining means determines if a message is unsolicited by checking if the real domain DD_0 matches the domain of the from-address A_0 and the domain of the from-address A_0 is in the suspect_domain database.

8. The networked computer in claim 1, wherein the determining means determines if a message is unsolicited by checking if the from-address A_0 matches the to-address A_1.

9. The networked computer in claim 1, wherein the determining means determines if a message is unsolicited by checking if the declared domain D_0 of MTA_0 is the same as the domain D_1 of MTA_1.

10. The networked computer in claim 1, wherein the determining means determines if a message is unsolicited by checking if the declared domain D_0 of MTA_0 does not match the real domain DD_1DD_0 and the declared domain D_0 is in the suspect_domain database.

11. The networked computer in claim 1, further includes a no_filter database and wherein the determining means determines if an unsolicited message should be blocked by checking if the to-address A_1 is in the no_filter database.

12. The networked computer in claim 1, further includes a rejected_connection database which logs the time, from-address A_0, to-address A_1, and the reason for the rejection if a message is rejected if the message is determined to be unsolicited.

13. The networked computer in claim 1, further includes an allowed_connection database which logs the time and to-address A_1 if the message is determined not to be unsolicited.

14. A method implemented in a networked computer for a receiving networked computer system with an Internet connection, a mail transfer agent MTA_1, an Internet address IP_1, a to-address A_1, a diversion address A'_1, a save_spam database and an operating system capable of executing the method to divert unsolicited messages from a transmitting networked computer system with an Internet connection and a mail transfer agent MTA_0, an Internet address IP_0, a from-address A_0, a declared domain D_0, and a real domain DD_0 comprising the steps of:

a) waiting for a new SMTP connection request;
   b) relaying and monitoring the replies from MTA_0 to MTA_1;
   c) relaying replies from MTA_1 to MTA_0;
   d) intercepting a RCPT reply from MTA_0 to MTA_1;
   e) determining if the message is unsolicited by analyzing the monitored replies;
   f) releasing the intercepted RCPT reply if the message is determined not to be unsolicited; and
   g) substituting the diversion address A'_1 for the to-address A_1 in the RCPT reply and sending the modified reply to MTA_1 if the message is determined to be unsolicited and if the to-address A_1 is in the save_spam database;

whereby MTA_1 controls the interaction between MTA_0 and MTA_1 before a RCPT command from MTA_0 is received and whereby the connection with MTA_0 is rejected before the data portion of the unsolicited message is transmitted.

15. A method implemented in a networked computer system for a receiving networked computer system with an Internet connection, a mail transfer agent MTA_1, an IP address IP_1, a domain name D_1, a to-address, A_1, a recipient diversion address A'_1, an allow_address database, a prevent_address database, a suspect_domain database, a bad_from database, a no_filter database, a rejected_connection database, an allowed_connection database, a save_spam database, a diversion database, and an operating system capable of executing the method to divert unsolicited messages from a transmitting networked computer system with an Internet connection, a mail transfer agent MTA_0, an IP address of IP_0, a declared domain name D_0, a real domain name DD_0, and a from-address of A_0 comprising the steps of:

a) waiting for a SMTP connection request on the receiving networked computer system's Internet connection;
   b) sending a 220 reply to MTA_0 to acknowledge the requested SMTP connection request;
   c) extracting IP_0 from the SMTP connection request;
   d) requesting the real domain name DD_0 for IP_0 from a DNS database;
   e) testing if the real domain name DD_0 is "no name";
   f) testing if IP_0 is in an open relay database;
   g) testing if IP_0 is in the allow_address database;
   h) testing if IP_0 is in the prevent_address database,
   i) requesting a connection with MTA_1;
   j) waiting for a 220 reply from MTA_1 to acknowledge the requested connection;
   k) waiting for a reply from either MTA_0 or MTA_1;
   l) jumping to step o) if the reply is not from MTA_1;
   m) relaying the reply from MTA_1 to MTA_0;
   n) jumping to step k) to wait for a new reply;
   o) jumping to step u) if the reply from MTA_0 is not a HELO;
   p) extracting the declared domain name D_0 from the reply;
   q) testing if the declared domain name D_0 is the same as D_1;
   r) testing if the declared domain name D_0 of MTA_0 does not match the real domain name DD_0 of MTA_0 AND the declared domain name D_0 of MTA_0 is in the suspect_domain database;
   s) relaying the HELO reply from MTA_0 to MTA_1;

t) jumping to step k) to wait for a new reply;
u) jumping to step aa) if reply from MTA_0 is not a MAIL;
v) extracting the from-address A_0;
w) testing if A_0 is in the bad_from database;
x) testing if DD_0 does not match the domain of A_0 and the domain of A_0 is in the suspect_domain database;
y) relaying MAIL reply to MTA_1;
z) jumping to step k) to wait for a new reply;
aa) jumping to step qq) if the reply from MTA_0 is not a RCPT;
bb) extracting the to-address A_1;
cc) testing if A_1 is in the no_filter database;
dd) testing if A_0 matches A_1;
ee) jumping to step nn) if t_allow OR t_no_filter OR NOT (t_prevent OR t_open OR t_DD_0 OR t_bad_from OR t_suspect_domain OR t_match);
ff) logging time, A_0, A_1, and reason for rejection in the rejected_connection database;
gg) jumping to step ll) if A_1 is not in the save_spam database;
hh) looking up A'_1 in the diversion database;
ii) substituting A'_1 for A_1 in the RCPT reply;
jj) sending the modified RCPT reply to MTA_1;
kk) jumping to step k) to wait for a new reply;
ll) rejecting the connection with MTA_0 connection by sending a 550 reply to MTA_0;
mm) jumping to step k) to wait for a new reply;
nn) logging time and A_1 in the allowed_connection database;
oo) relaying RCPT reply from MTA_0 to MTA_1;
pp) jumping to step k) to wait for a new reply;
qq) jumping to step bbb) if the reply from MTA_0 is not DATA;
rr) relaying DATA reply to MTA_1;
ss) waiting for a 354 reply from MTA_1;
tt) relaying the 354 reply from MTA_1 to MTA_0;
uu) waiting for the data from MTA_0;
vv) relaying the data from MTA_0 to MTA_1;
ww) waiting for a .\r\n from MTA_0;
xx) relaying the .\r\n from MTA_0 to MTA_1;
yy) waiting for a 250 reply from MTA_1;
zz) relaying the 250 reply to MTA_0;
aaa) jumping to step k) to wait for a new reply;
bbb) jumping to step eee) if reply from MTA_0 is not RSET, SEND, SCML, SAML, VRFY, NOOP, EXPN, HELP, or TURN;
ccc) relaying the reply to MTA_1;
ddd) jumping to step e) to wait for a new reply;
eee) jumping to step jjj) if the reply from MTA_0 is not a QUIT;
fff) relaying the QUIT reply to MTA_1;
ggg) waiting for a 221 reply from MTA_1;
hhh) relaying the 221 reply from MTA_1 to MTA_0;
iii) jumping to step a) to wait for a new connection;
jjj) sending a 500 reply to MTA_0 to signal a syntax error; and
kkk) jumping to step a) to wait for a new connection.

* * * * *